No. 822,786. PATENTED JUNE 5, 1906
W. STRUCK.
ELASTIC WHEEL TIRE.
APPLICATION FILED AUG. 22, 1905.
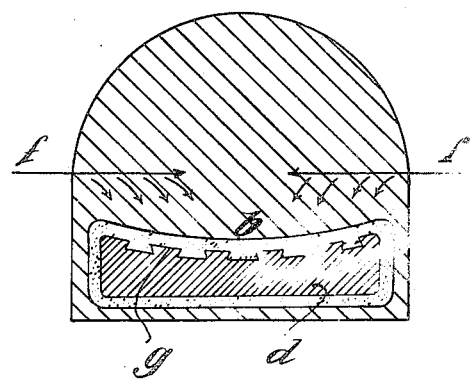
Witnesses:
C. Klostermann
E. C. Potter
Inventor.
Wilhelm Struck.
by N. C. Everts
Attorneys.

UNITED STATES PATENT OFFICE.

WILHELM STRUCK, OF BERLIN, GERMANY.

ELASTIC WHEEL-TIRE.

No. 822,786.  Specification of Letters Patent.  Patented June 5, 1906.

Application filed August 22, 1905. Serial No. 275,250.

*To all whom it may concern:*

Be it known that I, WILHELM STRUCK, a subject of the German Emperor, residing at Berlin, Germany, have invented certain new and useful Improvements in Elastic Wheel-Tires, of which the following is a specification, reference being had therein to the accompanying drawing, in which the figure is a transverse sectional view of a tire made in accordance with my invention.

This invention relates to elastic wheel-tires made of soft india-rubber, with metal hoops surrounded, as usual, by a layer of hard rubber embedded in the base of the tires. As hitherto made these hoops have been flat or of rectangular section. The irregular formation of the surface of the hard rubber $e$ causes the soft rubber to split off or separate from the same and to be worn through in consequence of the strains to which it is subject in use, especially when the hard rubber forms a sharp ridge, as shown.

The object of the present invention is to impart during the closing together of the pressing-molds such a direction to the movements of the particles of the plastic rubber masses that a displacement of the hard and soft rubber parts relatively to each other and the formation of a sharp ridge are prevented. This object is attained, according to the present invention, by forming the embedded iron hoop trough-shaped or concave on its tread side or outer circumferences, so that the plastic rubber masses when pressed in the mold are forced into the trough. In consequence of the direction of the pressing forces $f$ (indicated by arrows on the drawing) the formation of a sharp ridge of hard rubber is excluded, especially within the trough. At the same time a strong pressure directed rectangularly to the several layers of material is obtained, whereby an excellent adhesion or attachment of the hard rubber to the metal insertion on the one side and to the soft rubber on the other side is obtained.

The iron hoop may be provided in the known manner with hooks or projections $g$, as shown, in order to obtain a firmer adhesion of the india-rubber thereto.

Having now particularly described and ascertained the nature of my said invention and in what manner the same is to be performed, I declare that what I claim is—

1. An elastic solid tire having a metal hoop surrounded by a layer of hard rubber embedded in its base, the metal hoop being formed concave on the tread or outer circumferential side.

2. The combination with a solid elastic tire, of a metallic hoop formed concave on its outer circumferential side, and with projections on said concave side, said hoop being surrounded by a layer of hard rubber embedded in the base of the tire, substantially as described.

In witness whereof I have hereunto signed my name, this 14th day of July, 1905, in the presence of two subscribing witnesses.

WILHELM STRUCK.

Witnesses:
 WOLDEMAR HAUPT,
 HENRY HASPER.